United States Patent [19]

Mori et al.

[11] Patent Number: 4,786,429

[45] Date of Patent: Nov. 22, 1988

[54] ELECTROLYTE FOR ALUMINUM ELECTROLYTIC CAPACITOR

[75] Inventors: Shoichiro Mori; Makoto Ue; Kazuhiko Ida, all of Ibaraki, Japan

[73] Assignee: Mitsubishi Petrochemical Co., Ltd., Tokyo, Japan

[21] Appl. No.: 61,498

[22] Filed: Jun. 15, 1987

[30] Foreign Application Priority Data

Jun. 20, 1986 [JP]  Japan ................................ 61-144582
Jun. 20, 1986 [JP]  Japan ................................ 61-144588

[51] Int. Cl.$^4$ ............................................. H01G 9/02
[52] U.S. Cl. ..................................... 252/62.2; 361/433
[58] Field of Search ......................... 252/62.2; 361/433

[56] References Cited

U.S. PATENT DOCUMENTS

| | | | |
|---|---|---|---|
| 3,052,829 | 9/1962 | Ross et al. | 252/62.2 |
| 3,118,939 | 1/1964 | Finkelstein et al. | 252/62.2 |
| 3,300,693 | 1/1967 | Ross et al. | 252/62.2 |
| 3,547,423 | 12/1970 | Jenny et al. | 252/62.2 |
| 3,702,426 | 11/1972 | Ross et al. | 252/62.2 |
| 4,031,436 | 6/1977 | Alwitt | 252/62.2 |

FOREIGN PATENT DOCUMENTS 54-9704  4/1979  Japan ................................ 252/62.2

Primary Examiner—Jack Cooper
Attorney, Agent, or Firm—Oblon, Fisher, Spivak, McClelland & Maier

[57] ABSTRACT

An electrolyte for aluminum electrolytic capacitor is described, comprising a solution of, as a solute, a quaternary ammonium salt having as an anion component the conjugated base of an inorganic acid compound selected from the group consisting of
(1) boric acid,
(2) phosphoric acid,
(3) phosphorous acid and phosphorous acid monoesters, and phosphonic acids, and phosphonic acid monoesters,
(4) hypophosphorous acid and phosphinic acids,
(5) alkylboric acids and arylboric acids,
(6) silicic acid, and
(7) carbonic acid and carbonic acid monoesters, dissolved in an aprotic solvent mainly composed of γ-butyrolactone.

This electrolyte can reduce the internal resistance of the electrolytic cpacitor and broaden the temperature range over which the electrolytic capacitor can be used.

13 Claims, 1 Drawing Sheet

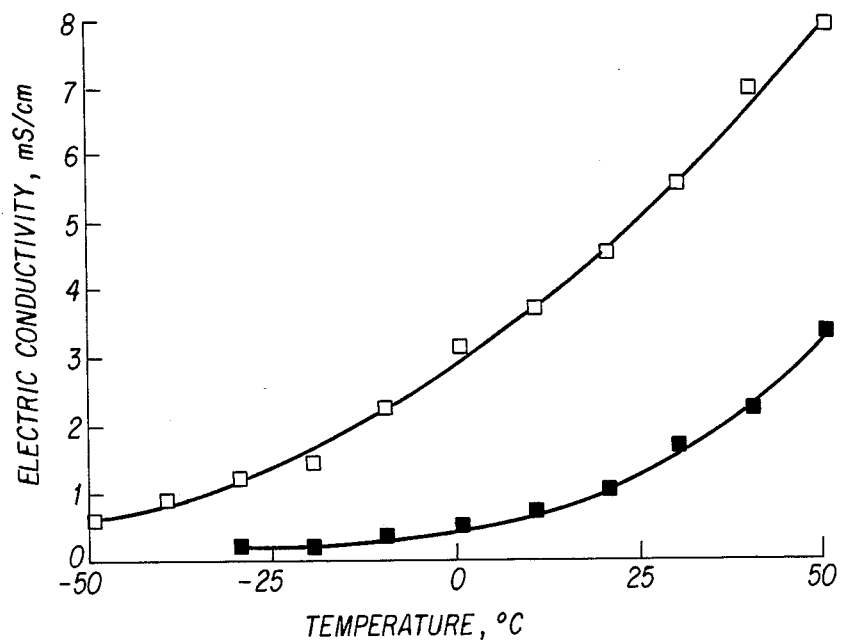

ELECTROLYTE FOR ALUMINUM ELECTROLYTIC CAPACITOR

FIELD OF THE INVENTION

This invention relates to an electrolyte for an aluminum electrolytic capacitor, and more particularly to an electrolyte, which can reduce internal resistance of an electrolytic capacitor and broaden the temperature range over which the capacitor can be used, through the use of an electrolyte containing quaternary ammonium salts of inorganic acids as solute dissolved in aprotic solvents mainly composed of γ-butyrolactone.

BACKGROUND OF THE INVENTION

Conventional electrolytes for aluminum electrolytic capacitors generally comprise some type of ionizable compound dissolved in a solvent.

The chemical or electric properties of the electrolyte, such as electric conductivity and scintillation voltage become main factors for determining the electric properties of the electrolytic capacitors.

For example, a solution of boric acid or ammonium borate in ethylene glycol, which has low electric conductivity and high scintillation voltage, has been used for aluminum electrolytic capacitors operating of 200 V or higher (U.S. Pat. No. 1,891,207). The maximum operating temperature for such an electrolyte system is less than 100° C. and normally 85° C., because a large amount of water formed during the rapid esterification of glycol and borate species as higher temperature deteriorates the electric properties of the electrolytic capacitors. The minimum operating temperature in such a system is above $-20°$ C. since glycol freezes at $-17°$ C.

On the other hand, a solution of an amine or a quaternary ammonium salt of carboxylic acid in an aprotic solvent such as N,N-dimethylformamide or γ-butyrolactone is used for low voltage electrolytic capacitors, which have good low temperature characteristics (U.S. Pat. Nos. 3,812,039 and 4,473,864).

However, electrolytes which have higher electric conductivity over the wider temperature range are desirable for imparting lower equivalent series resistance (ESR) and lower impedance at high frequencies to the electrolytic capacitor containing them.

SUMMARY OF THE INVENTION

As the result of various investigations on discovering electrolyte systems having higher electric conductivity, the inventors have discovered that an electrolyte containing a quaternary ammonium salt of an inorganic acid dissolved in an aprotic solvent mainly composed of γ-butyrolactone shows higher electric conductivity than those of conventional electrolyte systems and have succeeded in accomplishing this invention.

Therefore, this invention provides an electrolyte for aluminum electrolytic capacitor comprising a solution of, as a solute, a quaternary ammonium salt having as an anion component the conjugate base of an inorganic acid compound selected from the group consisting of (1) boric acid,
(2) phosphoric acid,
(3) phosphorous acid and phosphorous acid monoesters, and phosphonic acids, and phosphonic acid monoesters,
(4) hypophosphorous acid and phosphinic acids,
(5) alkylboric acids and arylboric acids,
(6) silicic acid, and
(7) carbonic acid and carbonic acid monoesters, dissolved in an aprotic solvent mainly composed of γ-butyrolactone.

This electrolyte can reduce the internal resistance of the electrolytic capacitor and broaden the temperature range over which the electrolytic capacitor can be used.

BRIEF DESCRIPTION OF THE DRAWING

The drawing is graphs showing the relations between the electric conductivities of the electrolytes obtained in Example 1 or Comparison Example 1 and temperatures.

DETAILED DESCRIPTION OF THE INVENTION

The cation component of the solute for use in this invention is a quaternary ammonium ion and examples of the ion are aliphatic quaternary ammonium ions such as tetraethylammonium, tetrapropylammonium, tetrabutylammonium, methyltriethylammonium, methyltripropylammonium, methyltributylammonium, dimethyldiethylammonium, dimethyldipropylammonium, dimethyldibutylammonium, ethyltripropylammonium, ethyltributylammonium, diethyldipropylammonium, diethyldibutylammonium, triethylpropylammonium, triethylbutylammonium, etc.; alicyclic quaternary ammonium ions such as N,N-dimethylpyrrolidinium, N,N-dimethylpiperidinium, N-methyl-N-ethylpyrrolidinium, N-methyl-N-ethylpiperidinium, N,N-diethylpyrrolidinium, N,N-diethylpiperidinium, N,N-tetramethylenepyrrolidinium, N,N-pentamethylenepiperidinium, etc.; and aromatic quaternary ammonium ions such as N-ethylpyridinium, N,N'-dimethylimidazolium, etc.

The anion component of the solute for use in this invention is a conjugate base of an inorganic acid compound selected from the group consisting of (1) boric acid,
(2) phosphoric acid,
(3) phosphorous acid and phosphorous acid monoesters, and phosphonic acids and phosphonic acid monoesters,
(4) hypophosphorous acid phosphinic acids,
(5) alkylboric acids and arylboric acids,
(6) silicic acid, and
(7) carbonic acid and carbonic acid monoesters.

The anion component of the solute for use in this invention is explained in more detail.

The conjugate base of boric acid (pKa 9.2) in (1) has the structure show by the formula (I).

$$[H_2SO_3]^- \quad (I)$$

The quaternary ammonium salt of the acid is obtained by adding at least one equivalent of the quaternary ammonium hydroxide to boric acid followed by heating, vacuum dehydrating, and drying and according to the result of the elemental analysis, the salt is an acid salt shown by $R_{N·H_2}BO_3·H_2O$ (wherein R represents a hydrocarbon group).

The conjugated base of phosphoric acid (pKa 2.2) in (2) has the structure shown by the formula (II)

$$[H_xPO_4]^{(3-x)\ominus} \quad (II)$$

wherein x represents 0, 1 or 2 and may form an acid salt or a neutral salt.

The conjugate bases of phosphorous acid and phosphorous acid monoesters, and phosphonic acids and phosphonic acid monoesters in (3) are shown by the formula (III)

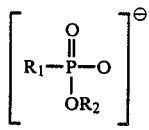  (III)

wherein $R_1$ and $R_2$ each represents a hydrogen atom or a hydrocarbon group having 1 to 10 carbon atoms.

Specific examples of these bases are anions of phosphorous acid (pKa 1.2), phosphorous acid monomethyl esters, alkylphosphonic acids such as methylphoshonic acid (pKa 2.4), alkylphosphonic acid monoesters such as monomethyl methylphosphonate, arylphosphonic acids such as phenylphosphonic acid, arylphosphonic acid monoesters such as monomethyl phenylphosphonate, etc.

The conjugate bases of hypophosphorous acid and phosphinic acids in (4) are shown by the formula (IV)

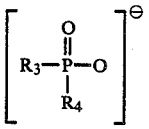  (IV)

wherein $R_3$ and $R_4$ each represents a hydrogen atom or a hydrocarbon group having 1 to 10 carbon atoms.

Specific examples of them are anions of hypophosphorous acid (pKa 1.2), alkylphosphinic acids such as methylphosphinic acid (pKa 3.1) and dimethylphosphinic acid, arylphosphinic acids such as diphenylphosphinic acid, etc.

The conjugate bases of alkylboric acids and arylboric acids in (5) are shown by the formula (V)

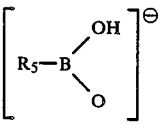  (V)

wherein $R_5$ represents a hydrocarbon group having 1 to 10 carbon atoms.

Specific examples of them are anions of methaneboric acid, ethaneboric acid, phenylboric acid (pKa 8.3), etc.

The conjugate bases of silicic acid (pKa 9.8) in (6) are shown by the formula (VI)

$$[H_xSi_yO_z]^{n\ominus}$$  (VI)

wherein x represents from 0 to 9, y represents from 1 to 10, z represents from 3 to 25, and n represents from 1 to 10, it being difficult to obtain a single compound as the conjugate base and the base may be a mixture.

The conjugate bases of carbonic acid (pKa 6.4) and carbonic acid monoesters in (7) are shown by the formula (VII)

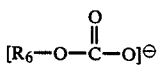  (VII)

wherein $R_6$ represents a hydrogen atom or a hydrocarbon group having 1 to 10 carbon atoms.

Specific examples thereof are anions of monomethyl carbonate, monoethyl carbonate, monophenyl carbonate, etc.

$R_1$ to $R_6$ in the formulae-(III), (IV), (V) and (VII) described above are preferably a hydrocarbon group having a low molecular weight, such as a methyl group, an ethyl group, etc., in the case of obtaining the electrolyte having high electric conductivity and are preferably a hydrocarbon group having 4 or more carbon atoms in the case of obtaining the electrolyte having high scintillation voltage. Also, $R_1$ to $R_6$ usually do not contain functional group but, as the case may be, contain a functional group such as a hydroxy group, an amino group, a nitro group, etc.

The anions of the strong acids apt to corrode the oxide film because of their high acidity. Also, the anions of the acids containing halogen atom liberate a halogen ion unpreferable for aluminum electrode.

On the other hand, the anions of the above-mentioned inorganic acid compounds are preferred since the acidities of the inorganic acid compounds are weak so that the anions of the inorganic acid compounds are excellent in the anodic oxidation film-forming faculty of aluminum and, in particular, boric acid (pKa 9.2) is a good "film-forming anion", and has high scintallation voltage, and hence can be used as medium to high voltage capacitors.

The solvent for dissolving the solute for use in this invention is an aprotic solvent mainly composed of γ-butyrolactone and the solvent is preferably, γ-butyrolactone alone or a mixture of at least 90% by weight of γ-butyrolactone and less than 10% by weight of other aprotic solvent(s).

Examples of other aprotic solvents which can be used as a minor portion of the solvent to be admixed with γ-butyrolactone are amides such as N-methylformamide, N-ethylformamide, N,N-dimethylformamide, N,N-diethylformamide, N-methylacetamide, N-ethylacetamide, N,N-dimethylacetamide, N,N-diethylacetamide, and N-methylpyrrolidinone, lactones such as β-butyrolactone, γ-valerolactone, and δ-valerolactone, carbonates such as ethylene carbonate, propylene carbonate, and butylene carbonate, sulfolanes such as sulfolane and 3-methylsulfolane, nitriles such as 3-methoxypropionitrile, and phosphates such as trimethyl phosphate.

Furthermore, γ-butyrolactone has a freezing point-boiling point range so broad that the freezing point thereof is −45° C. and it is lower than that of ethylene glycol (−13° C.), and the boiling point thereof is 204° C. and it is higher than that of N,N-dimethylformamide (153° C.). Also, γ-butyrolactone is less toxic and inflammable than N,N-dimethylformamide. Furthermore, γ-butyrolactone does not attack the sealing gaskets compared with amide solvents, and the electrolytic capacitor using this solvent is hardly suffered serious damage from halogen ion generated from the washing agent for solder flux which will be transmitted through a closure.

The amount of the quaternary ammonium salt dissolved in the solvent is below the saturation concentration, preferably from 0.1 to 40% by weight based on the total weight of the electrolyte.

The electrolyte of this invention is essentially composed of the quaternary ammonium salt of the aforesaid inorganic acid compound and the solvent but may further contain a small amount of an auxiliary solutes for various purposes such as the prevention of electrolytic corrosion, the reduction of leak current, absorption of hydrogen gas, etc.

The quaternary ammonium salt of the inorganic acid compound which is used as a solute in this invention, has good solubility for the solvent mainly composed of γ-butyrolactone and the electrolyte containing the quaternary ammonium salt shows high electric conductivity and is suitable for capacitors having a wide usable temperature range.

Then, the invention will be explained in greater detail with reference to the following examples, but the present invention should not be construed as being limited thereto.

EXAMPLE 1

[Synthesis of the quaternary ammonium salt of boric acid]

After adding 110.45 g (0.3 mol) of an aqueous 40% $NEt_4OH$ solution to 6.18 g (0.1 mol) of $H_3BO_3$, they were reacted at 60° C. until the system became homogeneous and then water was distilled off at 60° C. in vacuo. When the white powder obtained was subjected to elemental analysis, the following result was obtained.

| Elemental analysis for $R_4N.H_2BO_3.H_2O$ | | | | |
|---|---|---|---|---|
| | C | H | N | B |
| Calculated: | 45.17% | 11.38% | 6.17% | 5.9% |
| Found: | 45.96% | 11.57% | 6.70% | 5.17% |

Also, the product obtained by following the same manner as above using 73.63 g (0.2 mol) of an aqueous 40% $NEt_4OH$ solution showed almost the same elemental analysis value as above.

An electrolyte was obtained by dissolving the tetraethylammonium salt of boric acid thus obtained in an amount of 10% by weight based on a weight of an electrolyte in γ-butyrolactone as a solvent. The electric conductivity of the electrolyte at 25° C. was 4.9 mS/cm and the scintillation voltage was 330 V when a constant electric current of 4 mA/cm² was applied to one set of plus and minus smooth aluminum foils in the electrolyte. Also, the change of the electric conductivity of the electrolyte by the change of temperature is shown in the drawing (□).

COMPARISON EXAMPLE 1

An electrolyte was obtained by dissolving ammonium borate in an amount of 10% by weight based on a weight of an electrolyte in ethylene glycol as a solvent. The electric conductivity and the scintillation voltage of the electrolyte were measured in the same manner as in Example 1. The electric conductivity and the scintillation voltage of the electrolyte were 1.06 mS/cm and 450 V, respectively. The electric conductivity thereof at −20° C. was 0.14 mS/cm and was frozen at −40° C., which made the measurement impossible. The change of the electric conductivity of the electrolyte by the change of temperature is shown in the drawing (■).

COMPARISON EXAMPLE 2

When it was attempted to dissolve ammonium borate in γ-butyrolactone as a solvent, the borate scarcely dissovled in the solvent (less than 0.1%), the electric condutivity of the supernatant liquid at 25° C. was 0.01 mS/cm, and the mixture was unsuitable for electrolyte.

EXAMPLE 2

Electrolytes were prepared by following the mass procedure as in Example 1 while changing the concentration of the solute as shown in Table 1. The electric conductivities and the scintillation voltages of the electrolytes were measured in the same manner as in Example 1. The results are shown in Table 1 below.

TABLE 1

| Concentration of Solute (wt %) | Electric Conductivity at 25° C. (mS/cm) | Scintillation Voltage (V) |
|---|---|---|
| 1 | 1.14 | 450 |
| 5 | 3.43 | 350 |
| 20 | 5.40 | 300 |
| 40 | 2.50 | 270 |
| 50 | 1.11 | 250 |

COMPARISON EXAMPLES 3 TO 5

Electrolytes were obtained by dissolving $(C_4H_9)_3CH_3N.BF_4$ (Comparison Example 3), $(C_4H_9)_4N.BF_4$ (Comparison Example 4), and $(C_4H_9)_4N.B(C_6H_5)_4$ (Comparison Example 5), respectively, in an amount of 1% by weight based on a weight of an electrolyte or high concentration in γ-butyrolactone as a solvent and the electric conductivities and the scintillation voltages thereof were measured in the same manner as in Example 1. The results are shown in Table 2 below.

In each case the anodic oxidation film was greatly corroded, so that scintillation was not observed.

TABLE 2

| Comparison Example | Solute | Concentration of Solute (wt %) | Electric Conductivity at 25° C. (mS/cm) | Scintillation Voltage (V) |
|---|---|---|---|---|
| 3 | $(C_4H_9)_3CH_3N.BF_4$ | 1 | 1.09 | 80* |
|   | $(C_4H_9)_3CH_3N.BF_4$ | 55 | 5.88 | 90* |
| 4 | $(C_4H_9)_4N.BF_4$ | 1 | 1.09 | 70* |
|   | $(C_4H_9)_4N.BF_4$ | 55 | 4.86 | 90* |
| 5 | $(C_4H_9)_4N.B(C_4H_9)_4$ | 1 | 0.41 | 20* |
|   | $(C_4H_9)_4N.B(C_4H_9)_4$ | 40 | —** | —** |

*The highest voltage attained was shown since scintillation did not generate.
**The value was not measured since the solute was not dissolved to leave precipitates.

EXAMPLE 3

[Synthesis of quaternary ammonium salt of phosphoric acid]

To 2.31 g (0.02 mol) of an aqueous 85% $H_3PO_4$ solution was added 44.18 g (0.06 mol) of an aqueous 20% $NEt_4OH$ solution, and after causing reaction at 60° C., water was distilled off in vacuo to provide a white solid.

The result of the elemental analysis was as follows.

| Elemental analysis for $[(C_2H_5)_4N]_3PO_4.10H_2O$: | | |
|---|---|---|
| | C | H | N |
| Calculated: | 43.29% | 12.11% | 6.31% |
| Found: | 43.72% | 12.67% | 6.11% |

An electrolyte was obtained by dissolving the tetraethylammonium salt of phosphoric acid thus obtained in an amount of 20% by weight based on a weight of an electrolyte in γ-butyrolactone as a solvent. The electric conductivity of the electrolyte at 25° C. ws 6.7 mS/cm.

EXAMPLE 4

An electrolyte was obtained by dissolving monotetraethylammonium phosphite in an amount of 20% by weight based on a weight of an electrolyte in γ-butyrolactone as a solvent. The electric conductivity of the electrolyte at 25° C. was 7.4 mS/cm and the highest voltage attained was 140 V when a constant electric current of 5 mA/cm² was applied to one set of plus and minus smooth aluminum foils in the electrolyte.

EXAMPLES 5 TO 8

Electrolytes were obtained by following the same procedure as in Example 4 using monotetraethylammonium methylphosphonate (Example 5), methyltriethylammonium methyl methylphosphonate (Example 6), monotetraethylammonium hypophosphite (Example 7), and tetraethylammonium dimethylphosphinate (Example 8), respectively, in place of monotetraethylammonium phosphite. The electric conductivities and the highest voltages attained of these electrolytes were measured in the same manner as in Example 4 and the results obtained are shown in Table 3 below.

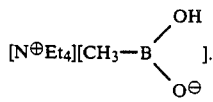

An electrolyte was obtained by dissolving the tetraethylammonium salt of methaneboric acid thus obtained in an amount of 20% by weight based on a weight of an electrolyte in γ-butyrolactone as a solvent. The electric conductivity of the electrolyte at 25° C. was 5.5 mS/cm and the scintillation voltage was 120 V when a constant electric current of 5 mA/cm² was applied to one set of plus and minus smooth aluminum foils in the electrolyte.

EXAMPLE 10

[Synthesis of quaternary ammonium salt of silicic acid]

To 2 g of silicic acid (SiO$_2$.xH$_2$O) was added 41.68 g of an aqueous 19% NEt$_4$OH solution and after causing reaction at 60° C. until the miture became homogeneous, water was distilled off from the reaction mixture in vacuo at 60° C. to provide a white solid.

An electrolyte was obtained by dissolving the tetraethylammonium salt of silicic acid thus obtained in an amount of 20% by weight based on a weight of an

TABLE 3

| Example | Solute | Concentration of Solute (wt %) | Electric Conductivity at 25° C. (mS/cm) | Highest Voltage Attained (V) |
|---|---|---|---|---|
| 4 | H—P(=O)(OH)—O⁻N⁺(C$_2$H$_5$)$_4$ | 20 | 7.4 | 140 |
| 5 | CH$_3$—P(=O)(OH)—O⁻N⁺(C$_2$H$_5$)$_4$ | 10 | 6.3 | 170 |
| 6 | CH$_3$—P(=O)(OCH$_3$)—O⁻N⁺(CH$_3$)(C$_2$H$_5$)$_3$ | 20 | 7.4 | 15 |
| 7 | H—P(=O)(H)—O⁻N⁺(C$_2$H$_5$)$_4$ | 20 | 4.9 | 240 |
| 8 | CH$_3$—P(=O)(CH$_3$)—O⁻N⁺(C$_2$H$_5$)$_4$ | 20 | 6.3 | 30 |

EXAMPLE 9

[Synthesis of ammonium salt of methaneboric acid]

To 1.27 g (0.02 mol) of methaneboric acid was added 7.85 g (0.02 mol) of an aqueous 40% NEt$_4$OH solution and after causing reaction at 60° C., water was distilled off from the reaction mixture in vacuo to provide a white solid. The product was an acid salt having the structure of electrolyte in γ-butyrolactone as a solvent. The electric conductivity of the electrolyte at 25° C. was 6.9 mS/cm and the scintillation voltage was 120 V when a constant electric current of 4 mA/cm² was applied to one set of plus and minus smooth aluminum foils in the electrolyte.

EXAMPLE 11

An electrolyte was obtained by dissolving a tetraethylammonium salt of carbonic acid in an amount of 20% by weight based on a weight of an electrolyte in γ-butyrolactone as a solvent. The electric conductivity of the electrolyte at 25° C. was 9.6 mS/cm and the scintillation voltage was 125 V when a constant electric current of 4 mA/cm² was applied to one set of plus and minus smooth aluminum foils in the electrolyte.

COMPARISON EXAMPLE 6

An electrolyte was obtained by following the same procedure as in Example 11 using a triethylammonium salt of maleic acid in place of the tetraethylammonium salt of carbonic acid in Example 11. The electric conductivity and the scintillation voltage of electrolyte were measured in the same manner as in Example 11. The electric conductivity and the scintillation voltage of the electrolyte were 4.2 mS/cm and 114 V, respectively.

EXAMPLE 12

An electrolyte was obtained by dissolving methyltriethylammonium methyl carbonate in an amount of 5% by weight based on a weight of an electrolyte in γ-butyrolactone as a solvent. The electric conductivity of the electrolyte at 25° C. was 3.0 mS/cm and the scintillation voltage was 180 V when a constant electric current of 5 mA/cm² was applied to one set of plus and minus smooth aluminum foils in the electrolyte.

While the invention has been described in detail and with reference to specific embodiments thereof, it will be apparent to one skilled in the art that various changes and modifications can be made therein without departing from the spirit and scope thereof.

What is claimed is:

1. An electrolyte for an aluminum electrolytic capacitor consisting essentially of a solution of a solute of a quaternary ammonium salt having as an anion component the conjugate base of an inorganic acid compound selected from the group consisting of
   (1) $H_2BO_3$,
   (2) phosphoric acid,
   (3) phosphorous acid and phosphorous acid monoesters, and phosphonic acids, and phosphonic acid monoesters,
   (4) hypophosphorous acid and phosphinic acids,
   (5) alkylboric acids and arylboric acids,
   (6) silicic acid, and
   (7) carbonic acid and carbonic acid monoesters, dissolved in an aprotic solvent mainly composed of γ-butyrolactone.

2. The electrolyte as claimed in claim 1, wherein the aprotic solvent mainly composed of γ-butyrolactone is γ-butyrolactone alone or a solvent containing at least 90% by weight of γ-butyrolactone.

3. The electrolyte of claim 2, wherein the solvent in said aprotic solvent other than γ-butyrolacetone is N-methylformamide, N-ethylformamide, N,N-dimethylformamide, N,N-diethylformamide, N-methylacetamide, N-ethylacetamide, N,N-dimethylacetamide, N,N-diethylacetamide, N,-methylpyrrolidinone, γ-valerolactone, δ-valerolactone, ethylene carbonate, propylene carbonate, butylene carbonate, sulfolane, 3-methylsulfolane, 3-methoxypropionitrile or trimethylphosphate.

4. The electrolyte as claimed in claim 1, wherein the concentration of the quaternary ammonium salt is from 0.1 to 40% by weight based on the total weight of the electrolyte.

5. The electrolyte as claimed in claim 1, wherein the quaternary ammonium cation of said salt is an aliphatic quaternary ammonium cation or an alicyclic quaternary ammonium cation.

6. The electrolyte as claimed in claim 5, wherein said aliphatic quaternary ammonium cation is a member selected from the group consisting of tetraethylammonium, tetrapropylammonium, tetrabutylammonium, methyltriethylammonium, methyltripropylammonium, methyltributylammonium, dimethyldiethylammonium, dimethyldipropylammonium, dimethyldibutylammonium, ethyltripropylammonium, ethyltributylammonium, diethyldipropylammonium, diethyldibutylammonium, triethylpropylammonium, and triethylbutylammonium, and wherein said alicyclic quaternary ammonium cation is N,N-dimethylpiperidinium, N,N-dimethylpyrrolidinium, N-methyl-N-ethylpyrrolidinium, N-methyl-N-ethylpiperidinium, N,N-diethylpyrolidinium, N,N-diethylpiperidinium, N,N-tetramethylenepyrrolidinium, and N,N-pentamethylenepiperidinium.

7. The electrolyte of claim 1, wherein said conjugate base of said $H_3BO_3$ has the formula:

$[H_2BO_3]^-$.

8. The electrolyte of claim 1, wherein said conjugate base of said phosphoric acid has the formula:

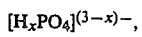
$[H_xPO_4]^{(3-x)-}$, wherein x is 0, 1, or 2.

9. The electrolyte of claim 1, wherein said conjugated base of said phosphorous acid, said phosphorous acid monoester, said phosphonic acid or phosphonic acid monoester has the formula:

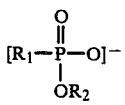

wherein $R_1$ and $R_2$ each is a hydrogen atom or a hydrocarbon group having from 1 to 10 carbon atoms.

10. The electrolyte of claim 1, wherein said conjugate base of said hypophosphorous acid and phosphonic acid has the formula:

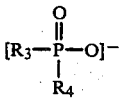

wherein $R_3$ and $R_4$ each represents hydrogen or a hydrocarbon group having from 1 to 10 carbon atoms.

11. The electrolyte of claim 1, wherein said conjugate base of said alkylboric acid or arylboric acid has the formula:

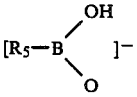

wherein $R_5$ is a $C_{1-10}$ hydrocarbon group.

12. The electrolyte of claim 1, wherein said conjugate base of said silicic acid acid has the formula:

$[H_xSi_yO_z]^{n-}$ wherein x ranges from 0 to 9, y ranges from 1 to 10, z ranges from 3 to 25 and n ranges from 1 to 10.

13. The electrolyte of claim 1, wherein said carbonic acid or carbonic acid monoester has the formula:
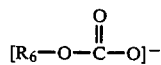
wherein $R_6$ is hydrogen or a $C_{1-10}$ hydrocarbon group.
* * * * *